(12) United States Patent
Kwon et al.

(10) Patent No.: US 12,092,795 B2
(45) Date of Patent: *Sep. 17, 2024

(54) DISPLAY DEVICE AND METHOD OF MANUFACTURING THE SAME

(71) Applicant: Samsung Display Co., LTD., Yongin-si (KR)

(72) Inventors: Seung Wook Kwon, Hwaseong-si (KR); Woo Yong Sung, Seoul (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/139,889

(22) Filed: Apr. 26, 2023

(65) Prior Publication Data
US 2024/0077654 A1   Mar. 7, 2024

Related U.S. Application Data

(63) Continuation of application No. 16/846,412, filed on Apr. 13, 2020, now Pat. No. 11,686,882.

(30) Foreign Application Priority Data

Jul. 8, 2019  (KR) .......................... 10-2019-0082192

(51) Int. Cl.
*G02B 1/14*  (2015.01)
*C09D 169/00*  (2006.01)
(Continued)

(52) U.S. Cl.
CPC .............. *G02B 1/14* (2015.01); *C09D 169/00* (2013.01); *G06F 1/1609* (2013.01);
(Continued)

(58) Field of Classification Search
CPC ....... G02B 1/14; C09D 169/00; G06F 1/1609; G06F 1/1652; G09F 9/301; Y02E 10/549;
(Continued)

(56) References Cited

U.S. PATENT DOCUMENTS 9,812,659 B2   11/2017   Kwon et al.
11,024,828 B2   6/2021   Kim et al.
(Continued)

FOREIGN PATENT DOCUMENTS

KR   20170137984 A   12/2017
KR   1020190014273 A   2/2019
(Continued)

OTHER PUBLICATIONS

Korean Office Action—Korean Application No. 10-2019-0082192 dated Mar. 22, 2024, citing references listed within.

*Primary Examiner* — Elmito Breval
(74) *Attorney, Agent, or Firm* — CANTOR COLBURN LLP

(57) ABSTRACT

A display device includes: a display member including a first region, a second region, and a third region defined between the first region and the second region; a first coated layer disposed on a first surface of the first region of the display member; and a second coated layer disposed on a first surface of the second region of the display member, where a first modulus of the first coated layer is smaller than a second modulus of the second coated layer.

19 Claims, 16 Drawing Sheets

(51) Int. Cl.
  *G06F 1/16*    (2006.01)
  *G09F 9/30*    (2006.01)
  *H04M 1/02*    (2006.01)

(52) U.S. Cl.
  CPC ............ *G06F 1/1652* (2013.01); *G09F 9/301* (2013.01); *H04M 1/0269* (2022.02)

(58) Field of Classification Search
  CPC .............. H04M 1/0268; H01L 27/3211; H01L 27/3248; H01L 27/3262; H01L 27/3279; H01L 27/32; H01L 51/0097; H01L 51/56
  See application file for complete search history.

(56) References Cited

U.S. PATENT DOCUMENTS

| | | |
|---|---|---|
| 2016/0048171 A1 | 2/2016 | Lee et al. |
| 2016/0233453 A1 | 8/2016 | Lee et al. |
| 2017/0229665 A1 | 8/2017 | Park et al. |
| 2017/0352834 A1 | 12/2017 | Kim et al. |
| 2018/0180911 A1 | 6/2018 | Odaka |
| 2018/0210266 A1 | 7/2018 | Lius et al. |
| 2018/0375043 A1 | 12/2018 | Jung et al. |
| 2019/0173030 A1 | 6/2019 | Kim et al. |
| 2021/0280828 A1 | 9/2021 | Kim et al. |

FOREIGN PATENT DOCUMENTS

| | | |
|---|---|---|
| KR | 1020190018986 A | 2/2019 |
| KR | 1020190035103 A | 4/2019 |
| KR | 1020190078842 | 7/2019 |

DISPLAY DEVICE AND METHOD OF MANUFACTURING THE SAME

This application is a continuation of U.S. patent application Ser. No. 16/846,412, filed on Apr. 13, 2020, which claims priority to Korean Patent Application No. 10-2019-0082192, filed on Jul. 8, 2019, and all the benefits accruing therefrom under 35 U.S.C. § 119, the content of which in its entirety is herein incorporated by reference.

BACKGROUND

1. Field

The disclosure relates to a display device and a method of manufacturing the display device.

2. Description of the Related Art

Electronic devices that provide images to a user, such as smartphones, tablet personal computers ("PC"s), digital cameras, notebook computers, navigation systems and smart televisions, may include a display device for displaying images. A display device may include a display panel that generates and displays an image and various input devices.

In addition, a flexible display device including a display unit, signal wirings, etc. on a flexible substrate such as plastic, which is a flexible material, and thus capable of displaying images even when bent like paper is drawing attention as a next-generation display device.

Such a flexible display device is being applied to various devices such as computer monitors and televisions to personal portable devices, and research on flexible display devices having a wide display area and a reduced volume and weight is being conducted.

SUMMARY

A flexible display device may include flat portions and a bending portion disposed between the flat portions. In the flat portions, compensation members which support a display member including pixels may be disposed on a lower surface of the display member. Depending on the strength and physical properties of the compensation members, poor bonding may occur in the process of attaching a driver chip to an upper surface of the display member.

Embodiments of the disclosure provide a display device with improved driver chip bonding.

According to an embodiment of the disclosure, a display device includes: a display member including a first region, a second region, and a third region defined between the first region and the second region; a first coated layer disposed on a first surface of the first region of the display member; and a second coated layer disposed on a first surface of the second region of the display member, where the first coated layer has a first modulus, and the second coated layer has a second modulus, which is greater than the first modulus.

In an embodiment, each of the first coated layer and the second coated layer may include a cured resin, and the second coated layer may further include a first material.

In an embodiment, the first material may include at least one material selected from an acrylic organic material and polycarbonate ("PC").

In an embodiment, the first material may include an inorganic material.

In an embodiment, the inorganic material may include a metal oxide or a non-metal oxide.

In an embodiment, the second region of the display member may include a first pad region and a second pad region, the first pad region may be disposed between the third region and the second pad region, a driver chip is attached to a second surface of the first pad region, and a circuit board is attached to a second surface of the second pad region.

In an embodiment, the display device may further include a first pad disposed on the second surface of the first pad region, and a second pad disposed on the second surface of the second pad region, where the driver chip is coupled to the first pad, and the circuit board is coupled to the second pad.

In an embodiment, the display device may further include a first anisotropic conductive film disposed between the first pad and the driver chip, and a second anisotropic conductive film disposed between the second pad and the circuit board.

In an embodiment, each of the first coated layer and the second coated layer may be disposed directly on a first surface of the display member.

In an embodiment, a thickness of the first coated layer may be greater than a thickness of the second coated layer.

In an embodiment, the display device may further include a third coated layer disposed between the second coated layer and the first surface of the display member, where the third coated layer has a third modulus less than the second modulus of the second coated layer.

In an embodiment, the third coated layer and the first coated layer may include a same material as each other.

In an embodiment, the display device may further include a third coated layer disposed on a first surface of the third region of the display member, where the third coated layer has a third modulus less than the second modulus of the second coated layer.

In an embodiment, the first modulus may be in a range of about 20 megapascal (MPa) to about 400 MPa, and the second modulus may be in a range of about 500 MPa to about 2 gigapascal (GPa).

In an embodiment, the first region and the second region may be flat, the third region may be bent in a thickness direction, and the first region and the second region may overlap each other in the thickness direction.

In an embodiment, an inner side surface of the first coated layer may be aligned with a boundary between the first region and the third region, an inner side surface of the second coated layer may be aligned with a boundary between the second region and the third region, and the inner side surface of the first coated layer and the inner side surface of the second coated layer may be rounded.

According to an embodiment of the disclosure, a method of manufacturing a display device includes: preparing a display member including a first region, a second region, and a third region defined between the first region and the second region; and providing a first coated layer on the first region of the display member and a second coated layer on the second region of the display member; where the first coated layer has a first modulus, and the second coated layer has a second modulus, which is less than the first modulus.

In an embodiment, the providing the first coated layer and the second coated layer may include coating a photosensitive resin on the first region and the second region of the display member and curing the coated photosensitive resin with ultraviolet light.

In an embodiment, the providing the first coated layer and the second coated layer may further include coating at least one material selected from an acrylic organic material, PC, and a metal oxide or a non-metal oxide on the second region of the display member.

In an embodiment, the method may further include attaching a driver chip onto a first surface of the display member after the providing the first coated layer on the first region of the display member and the second coated layer on the second region of the display member.

BRIEF DESCRIPTION OF THE DRAWINGS

These and/or other features will become apparent and more readily appreciated from the following description of the embodiments, taken in conjunction with the accompanying drawings, in which.

DETAILED DESCRIPTION

Figure 1:
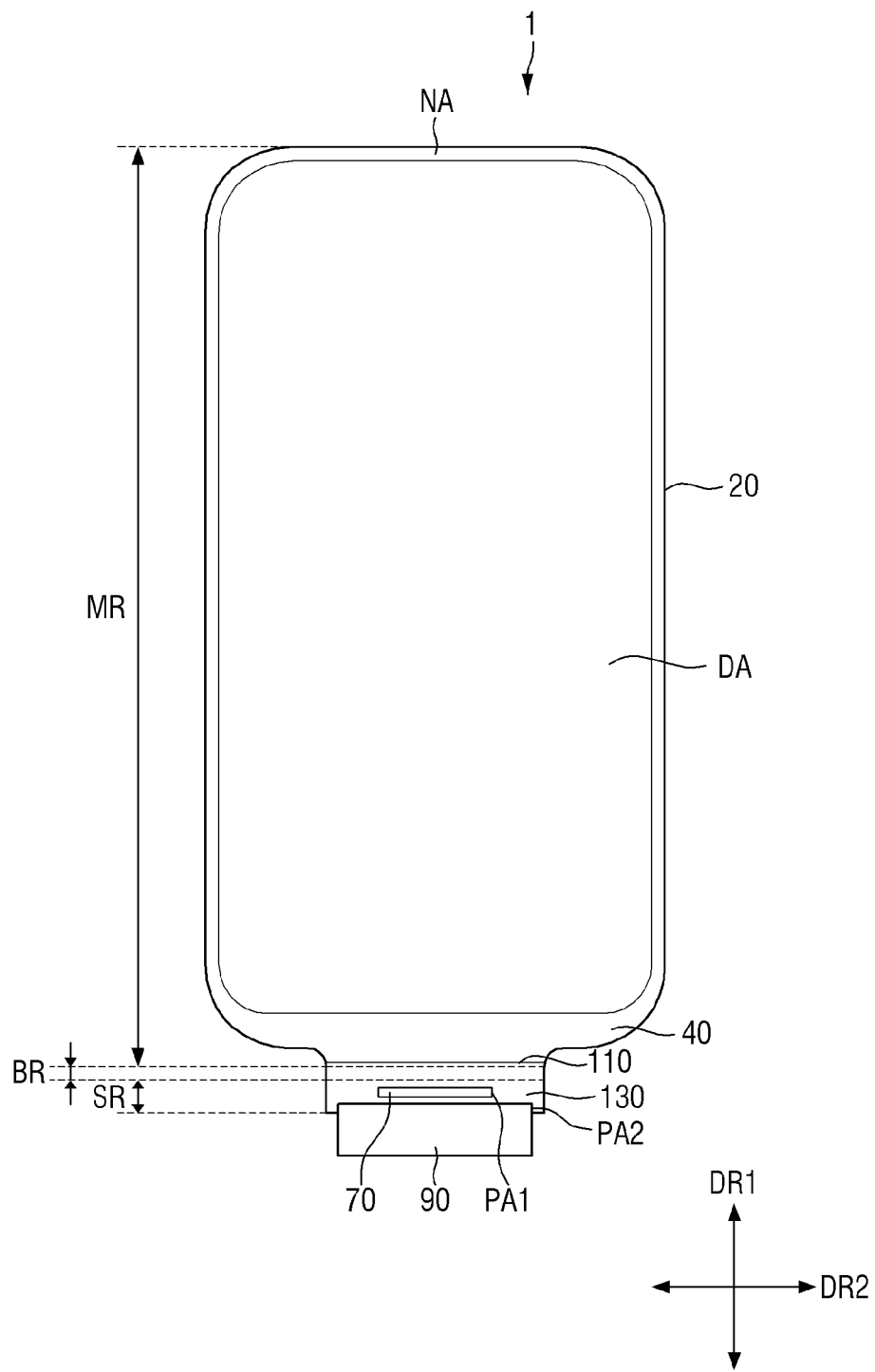
FIG. 1 is a plan view of a display device according to an embodiment.

The invention will now be described more fully hereinafter with reference to the accompanying drawings, in which preferred embodiments of the invention are shown. The invention may, however, be embodied in different forms and should not be construed as limited to the embodiments set forth herein. Rather, these embodiments are provided so that this disclosure will be thorough and complete, and will filly convey the scope of the invention to those skilled in the art. The same reference numbers indicate the same components throughout the specification. In the attached figures, the thickness of layers and regions is exaggerated for clarity.

It will be understood that when an element or layer is referred to as being "on" another element or layer, the element or layer can be directly on another element or layer or intervening elements or layers may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." "At least one of A and B" means "A and/or B." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, embodiments of the invention will be described in detail with reference to the accompanying drawings.

Figure 2:
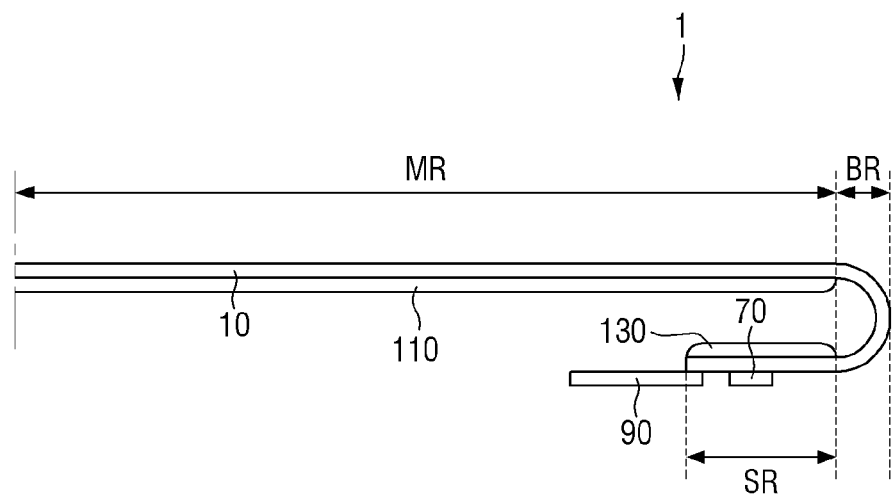
FIG. 2 is a schematic partial cross-sectional view of the display device according to an embodiment.
Figure 3A:
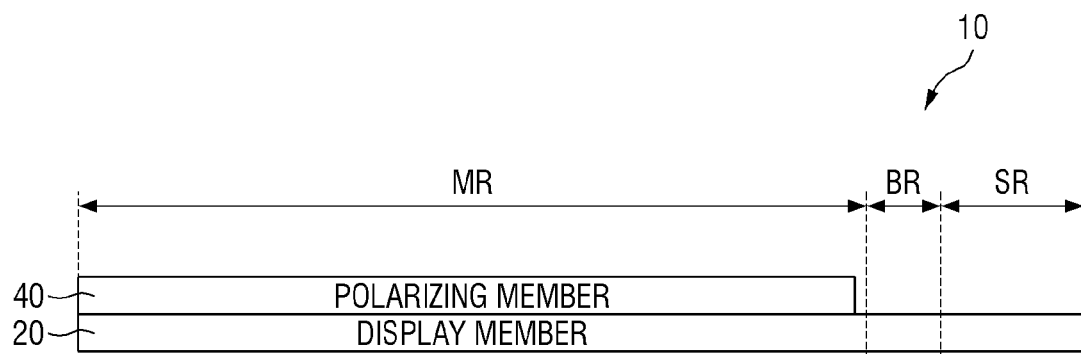
FIG. 3A is a schematic cross-sectional view of a display member.
Figure 3B:
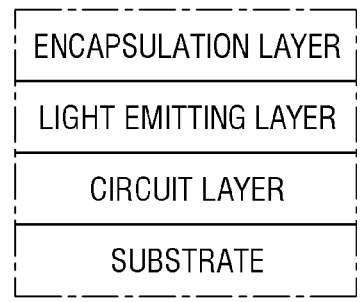
FIG. 3B is a schematic enlarged view of the encircled portion of FIG. 3A.

FIG. 1 is a plan view of a display device 1 according to an embodiment. FIG. 2 is a schematic partial cross-sectional view of the display device 1 according to an embodiment. FIG. 3A is a schematic cross-sectional view of a display member 20. FIG. 3B is a schematic enlarged view of the encircled portion of FIG. 3A.

In embodiments, a first direction DR1 and a second direction DR2 intersect each other in different directions, as shown in FIG. 1. In an embodiment, the first direction DR1 may be a length direction of the display device 1 and the second direction DR2 may be a width direction of the display device 1, for example. In the plan view of FIG. 1, the first direction DR1 is defined as a vertical direction, and the second direction DR2 is defined as a horizontal direction for ease of description. In embodiments described herein, a side in the first direction DR1 refers to an upper direction in a plan view, the opposing side in the first direction DR1 refers to a lower direction in the plan view, a side in the second direction DR2 refers to a right direction in the plan view, and the opposing side in the second direction DR2 refers to a left direction in the plan view. However, directions in embodiments should be understood as relative directions, and embodiments are not limited to the mentioned directions.

Referring to FIGS. 1 through 3B, an embodiment of the display device 1 may be any electronic device including a display screen. In an embodiment, the display device 1 may be a portable electronic device including a display screen, such as a mobile phone, a smartphone, a tablet personal computer ("PC"), an electronic watch, a smart watch, a watch phone, a mobile communication terminal, an electronic notebook, an electronic book, a portable multimedia player ("PMP"), a navigation device, a game machine and a digital camera, as well as a television, a laptop computer, a monitor, a billboard and an Internet of things device, for example.

In an embodiment, the display device 1 includes an active region DA and a non-active region NA. In an embodiment of the display device 1, a region where an image is displayed may be defined as a display region, a region where no image is displayed may be defined as a non-display region, and a region where a touch input is sensed may be defined as a touch region. In such an embodiment, the display region and the touch region may be included in the active region DA. The display region and the touch region may overlap each other. In an embodiment, the active region DA may be a region where an image is displayed and a touch input is sensed. The active region DA may have a shape of a rectangle or a rectangle with rounded corners. The active region DA illustrated in the drawings may have a shape of a rectangle with rounded corners and is longer in the first direction DR1 than in the second direction DR2. However, the shape of the active region DA is not limited to this shape, and the shape of the active region DA may be variously modified to be in another shape such as a rectangle that is longer in the second direction DR2 than in the first direction DR1, a square or other polygons, a circle, and an ellipse.

The non-active region NA is disposed around the active region DA. The non-active region NA may be a bezel region. The non-active region NA may surround all sides (four sides in the drawings) of the active region DA. However, embodiments are not limited to this case. In one alternative embodiment, for example, the non-active region NA may not be disposed around an upper side, a left side or a right side of the active region DA.

The display device 1 includes a display panel 10 that provides a display screen. In an embodiment, the display panel 10 may be an organic light emitting display panel, a micro light emitting diode ("LED") display panel, a nano LED display panel, a quantum dot light emitting display panel, a liquid crystal display panel, a plasma display panel, a field emission display panel, an electrophoretic display panel, or an electrowetting display panel. Hereinafter, for convenience of description, embodiments where the display panel is an organic light emitting display panel will be described in detail, but embodiments are not limited thereto, and the display panel 10 may be another display panel as long as the same technical spirit is applicable.

In an embodiment, the display panel 10 may include a flexible substrate including a flexible polymer material such as polyimide. Accordingly, in such an embodiment, the display panel 10 may be bent, curved, folded, or rolled.

The display panel 10 may include a bending region BR where the display panel 10 is bent. The display panel 10 may be divided into a main region MR located on or extending from a side of the bending region BR and a sub region SR located on or extending from an opposing side of the bending region BR.

The display region of the display panel 10 is defined in the main region MR. In an embodiment, an edge portion around the display region in the main region MR, the entire portion of the bending region BR, and the entire portion of the sub region SR may collectively define the non-display region. In an alternative embodiment, at least a portion of the bending region BR and/or the sub region SR may include the display region.

The main region MR may have a shape substantially similar to a planar shape of the display device 1. The main region MR may be a flat region located on a plane. However, embodiments are not limited to this case, and at least one of edges of the main region MR excluding an edge (side) connected to the bending region BR may also be curved or may be bent perpendicularly.

In an embodiment, where at least one of the edges of the main region MR excluding the edge (side) connected to the bending region BR is curved or bent, the display region may also be disposed at the curved or bent edge. However, embodiments are not limited to this case, and the curved or bent edge may also be the non-display region where no image is displayed or may include a combination of the display region and the non-display region.

The bending region BR is connected to a side of the main region MR in the first direction DR1. In one embodiment, for example, the bending region BR may be connected to a lower short side of the main region MR. A width (e.g., a length in the second direction DR2) of the bending region BR may be smaller than a width of (the short side of) the main region MR. A portion of the main region MR connected to the bending region BR may protrude from the lower short side of the main region MR and may have a width substantially the same as that of the bending region BR.

In the bending region BR, the display panel 10 may be bent downward in a thickness direction with a curvature, or in a direction opposite to a display surface. The bending region BR may have a constant radius of curvature. However, embodiments are not limited to this case, and the bending region BR may also have a different radius of curvature in each section. As the display panel 10 is bent in the bending region BR, a surface of the display panel 10 may be reversed. That is, a first surface of the display panel 10 which faces upward may be changed to face outward through the bending region BR and then to face downward.

The sub region SR extends from the bending region BR. In a bended state, the sub region SR may extend parallel to the main region MR. The sub region SR may overlap the main region MR in the thickness direction of the display panel 10. A width of the sub region SR (in the second direction DR2) may be equal to the width of the bending region BR, but not being limited thereto.

The sub region SR may include a first pad region PA1 and a second pad region PA2 located farther from the bending region SR than the first pad region PA1 in a plan view as illustrated in FIG. 1. A plurality of signal wiring pads may be disposed in the first pad region PA1 of the sub region SR. The signal wiring pads may be disposed on a first surface of the first pad region PA1 of the sub region SR. A driver chip 70 may be disposed on the first surface of the first pad region PA1. The driver chip 70 may be coupled to the signal wiring pads. The driver chip 70 may include an integrated circuit for driving the display panel 10. The integrated circuit may include an integrated circuit for a display and/or an integrated circuit for a touch unit. The integrated circuit for a display and the integrated circuit for a touch unit may be provided as separate chips or may be integrated into a single chip.

A plurality of display signal wiring pads may be disposed on a second surface of the second pad region PA2 of the sub region SR of the display panel 10. A circuit board 90 may be connected to the second pad region PA2 of the sub region SR of the display panel 10. The circuit board 90 may be coupled to the signal wiring pads. The circuit board 90 may be a flexible printed circuit board or film.

In an embodiment, as shown in FIG. 3A, the display panel 10 may include the display member 20 and a polarizing member 40 disposed on the display member 20. The display member 20 may be disposed in the main region MR, the bending region BR, and the sub region SR. In an embodiment, as shown in FIG. 3B, the display member 20 includes a substrate, a circuit layer disposed on the substrate, a light emitting layer disposed on the circuit layer, and an encapsulation layer disposed on the light emitting layer. The display panel 10 may further include a first electrode disposed under the light emitting layer and a second electrode disposed on the light emitting layer. The first electrode, the light emitting layer, and the second electrode may constitute a light emitting element. The light emitting element may be disposed in each pixel. The first electrode may be an anode, and the second electrode may be a cathode.

The substrate may include a flexible material. The flexible material may include at least one material selected from polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate.

The circuit layer may include a display wiring, a display electrode, and a transistor. The circuit layer may include first pads 25 (see FIG. 5) and a second pad 27 (see FIG. 5) which will be described later.

The light emitting layer may include an organic light emitting material. The light emitting layer may be sealed by an encapsulation layer. The encapsulation layer may seal the light emitting layer to prevent introduction of moisture from the outside. The encapsulation layer may be composed of a single inorganic layer or a plurality of inorganic layers, or may be composed of an inorganic layer and an organic layer stacked alternately.

In an embodiment, a planar shape of the display member 20 may be substantially the same as a planar shape of the display panel 10 described above. in such an embodiment, the display member 20 may have substantially the same planar shape as the main region MR, the bending region BR, and the sub region SR.

The polarizing member 40 may generally overlap the main region MR in the thickness direction and may not be disposed in the bending region BR. Although not illustrated, a bonding member may be disposed between the polarizing member 40 and the display member 20. The bonding member may bond the polarizing member 40 and the display member 20 to each other. The bonding member may include a pressure sensitive adhesive ("PSA").

The polarizing member 40 may include a plurality of stacked films. In an embodiment, the polarizing member 40 may include a first optical protective film disposed on the encapsulation layer, a retardation film disposed on the first optical protective film, a polarizing film disposed on the retardation film, and a second optical protective film disposed on the polarizing film.

The optical protective films of the polarizing member 40 may protect the polarizing film and the retardation film of the polarizing member 40 from external moisture, foreign substances, etc. The optical protective films may include an organic insulating material.

The retardation film may convert the phase of light. In one embodiment, for example, the retardation film may be a λ/4 retardation film. The retardation film may be a birefringent film including a polymer, an alignment film of a liquid crystal polymer, a film including an alignment layer of a liquid crystal polymer, or the like.

The polarizing film may selectively transmit light. In one embodiment, for example, the polarizing film may be a linear polarizing film. The polarizing film may be a polyvinyl alcohol ("PVA") film. The polarizing film may be prepared by drawing a PVA film in one direction and then adsorbing iodine (I) or a dichroic dye onto the PVA film. The polarizing film has an absorption axis in the drawing direction and a transmission axis perpendicular to the absorption axis. In such an embodiment, only light linearly polarized in a direction parallel to the transmission axis among light incident on the polarizing film is output.

In an embodiment, as illustrated in FIG. 2, a first coated layer 110 may be disposed on a second surface of the main region MR of the display panel 10, and a second coated layer 130 may be disposed on a second surface of the sub region SR of the display panel 10. The first coated layer 110 and the second coated layer 130 may include different materials from each other. Each of the first coated layer 110 and the second coated layer 130 may include a photosensitive resin. Each of the first coated layer 110 and the second coated layer 130 may be formed by coating the photosensitive resin directly on a second surface of the display panel 10.

An inner side surface of the first coated layer 110 may be aligned with a boundary between the main region MR and the bending region BR, and an inner side surface of the second coated layer 130 may be aligned with a boundary between the sub region SR and the bending region BR. The first coated layer 110 and the second coated layer 130 may expose a second surface of the bending region BR of the display panel 10. The first coated layer 110 and the second coated layer 130 will be described in detail later.

Figure 4:
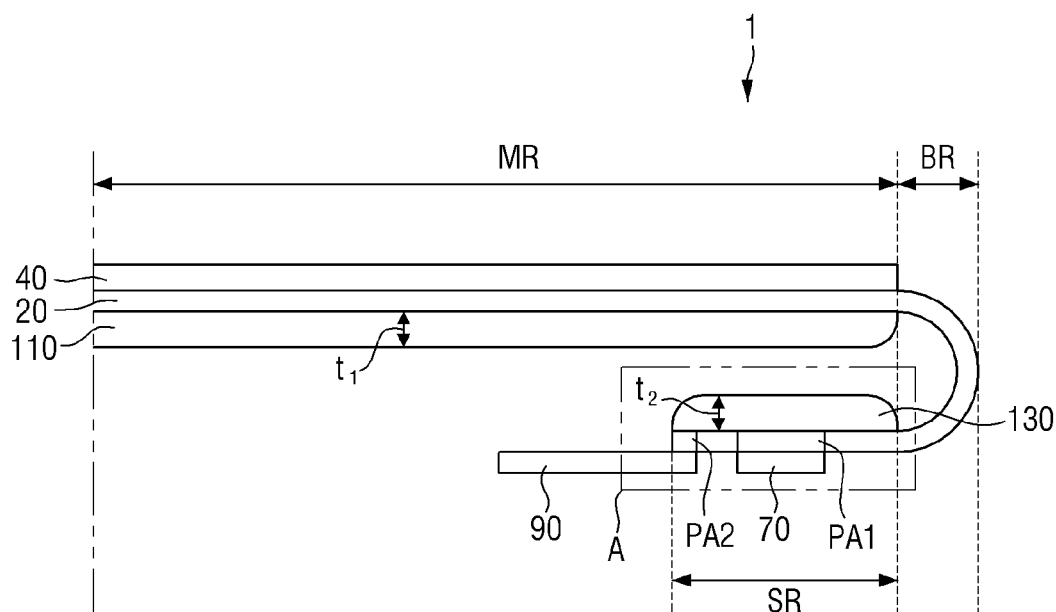
FIG. 4 is a detailed cross-sectional view of FIG. 2.
Figure 5:
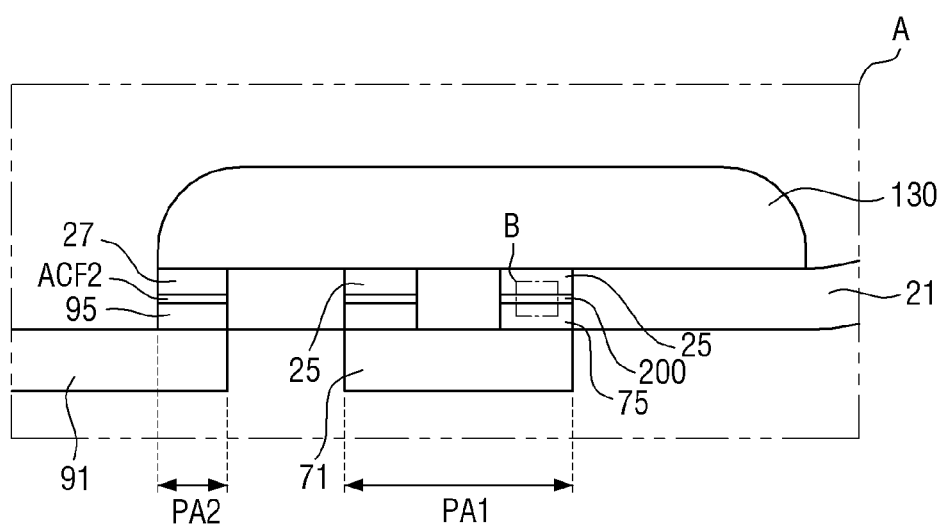
FIG. 5 is an enlarged cross-sectional view of region A of FIG. 4.
Figure 6:
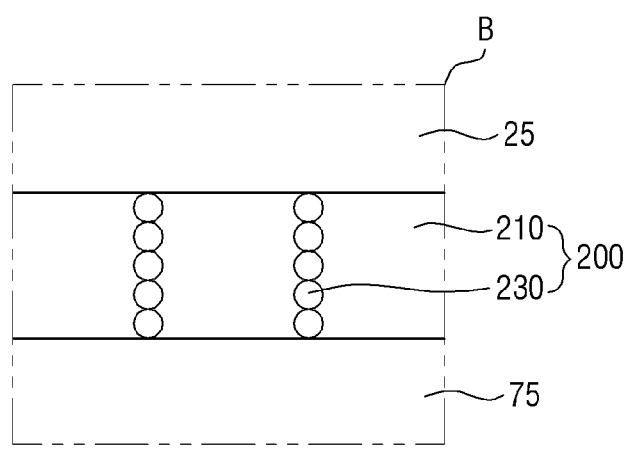
FIG. 6 is an enlarged cross-sectional view of region B of FIG. 5.

FIG. 4 is a detailed cross-sectional view of FIG. 2. FIG. 5 is an enlarged cross-sectional view of region A of FIG. 4. FIG. 6 is an enlarged cross-sectional view of region B of FIG. 5.

Referring to FIGS. 4 through 6, in an embodiment, the first coated layer 110 may have a first thickness t1, and the second coated layer 130 may have a second thickness t2. The first thickness t1 and the second thickness t2 may be in a same range as each other. In an embodiment, the first thickness t1 may be in a range from about 5 micrometers (μm) to about 80 μm, and the second thickness t2 may be in a range from about 5 μm to about 80 μm.

Each of the first coated layer 110 and the second coated layer 130 may be provided or formed by coating the photosensitive resin on a second surface of the display member 20. The coated photosensitive resin may be changed to the first coated layer 110 and the second coated layer 130 through a curing process such as a ultraviolet curing. In an embodiment, the inner side surface of each of the first coated layer 110 and the second coated layer 130 may have a curved or round shape. In an embodiment, each of the inner side surface of the first coated layer 110 which is aligned with the boundary between the main region MR and the bending region BR and the inner side surface of the second coated layer 130 which is aligned with the boundary between the sub region SR and the bending region BR may have a round shape. In such an embodiment, when the display panel 10 is bent in the bending region BR, physical damage at the boundary between the main region MR and the bending region BR and at the boundary between the sub region SR and the bending region BR may be effectively prevented.

According to an embodiment, the first coated layer 110 may have a first modulus, and the second coated layer 130 may have a second modulus. In an embodiment, the second modulus may be greater than the first modulus. In such an embodiment, the first modulus may be smaller than the second modulus. That is, the rigidity or strength of the second coated layer 130 may be greater than that of the first coated layer 110. The first modulus may be in a range of about 20 megapascal (MPa) to about 400 MPa, and the second modulus may be in a range of about 500 MPa to about 2 gigapascal (GPa).

In an embodiment, where the second modulus of the second coated layer 130 is greater than the first modulus of the first coated layer 110, the second coated layer 130 may include a first material in addition to the photosensitive resin. The first material may cause the second modulus of the second coated layer 130 to be greater than the first modulus of the first coated layer 110.

In an embodiment, the first material may include an organic material. The organic material may be at least one material selected from an acrylic organic material and polycarbonate ("PC").

In an embodiment, the first material may include an inorganic material. The inorganic material may be a metal oxide or a non-metal oxide. The metal oxide may be, for example, aluminum oxide (AlO) or zirconium oxide (ZrO), and the non-metal oxide may be, for example, silicon oxide (SiO).

In an embodiment, the first material may include both the organic material and the inorganic material.

In an embodiment, as illustrated in FIG. 4, the driver chip 70 may be disposed on the first pad region PA1 of the display member 20, and the circuit board 90 may be disposed on the second pad region PA2 of the display member 20.

Referring to FIG. 5, a plurality of first pads 25 may be disposed in the first pad region PA1 of a substrate 21 of the display member 20, and a second pad 27 may be disposed in the second pad region PA2 of the substrate 21 of the display member 20.

Although not illustrated, the second pad 27 may be electrically connected to the first pads 25, and the first pads 25 may be electrically connected to data lines of the display member 20.

The driver chip 70 may include a chip portion 71 and a plurality of bumps 75 for electrically connecting the chip portion 71 and the first pads 25 to each other. The bumps 75 may correspond to the first pads 25.

The circuit board 90 may include a circuit board portion 91 and a lead wiring 95 disposed between the circuit board portion 91 and the second pad 27.

First bonding members 200 may be disposed between the bumps 75 and the first pads 25, and a second bonding member ACF2 may be disposed between the lead wiring 95 and the second pad 27. In an embodiment, the first bonding members 200 and the second bonding member ACF2 may be anisotropic conductive films. In such an embodiment, the first bonding members 200 may be first anisotropic conductive films, and the second bonding member ACF2 may be a second anisotropic conductive film.

In an embodiment, as illustrated in FIG. 6, each of the first bonding members 200 may include a resin film 210 and a plurality of conductive balls 230 dispersed in the resin film 210. The conductive balls 230 may have a structure in which a polymer particle surface is coated with a metal such as nickel (Ni), gold (Au), or the like. The resin film 210 may include a thermosetting resin or a thermoplastic resin. In addition, the resin film 210 of each of the first bonding members 200 may further include a material having an adhesive function.

Each of the first bonding members 200 may not only electrically conduct a first pad and a bump 75 overlapping each other in the thickness direction through the conductive balls 230 but also bond the adjacent first pad 25 and bump 75 to each other.

In an alternative embodiment, the first pads 25 and the bumps 75 may be directly connected to each other, and the second pad 27 and the lead wiring 95 may be directly connected to each other. In one embodiment, for example, the first pads 25 and the bumps 75 may be ultrasonically bonded to each other, and the second pad 27 and the lead wiring 95 may be ultrasonically bonded to each other.

In an embodiment of the display device 1, the second coated layer 130 may overlap the first pad region PA1 and the second pad region PA2 in the thickness direction.

When the bumps 75 of the driver chip 70 are bonded to the first pads 25 and when the lead wiring 95 of the circuit board 90 is bonded to the second pad 27, heat and pressure may be applied to the bonding members 200 and ACF2 through the driver chip 70 and the circuit board 90 in a state where the bonding members 200 and ACF2 are interposed between the bumps 75 and the first pads 25 and between the lead wiring 95 and the second pad 27, respectively. Here, if the rigidity or hardness of the second coated layer 130 is low, it may be difficult for the second coated layer 130 to support the bumps 75 and the first pads 25 and the lead wiring 95 and the second pad 27 when the bumps 75 and the first pads 25 are bonded to each other and when the lead wiring 95 and the second pad 27 are bonded to each other. Specifically, if the second modulus of the second coated layer 130 is low, when the bumps 75 are bonded to the first pads 25 and when the lead wiring 95 is bonded to the second pad 27, the second coated layer 130 may fail to securely support the bumps 75 and the first pads 25 and the lead wiring 95 and the second pad 27 and may move in a direction in which pressure is applied through the driver chip 70 and the circuit board 90 together with the display member 20 including a flexible substrate. In this case, the bumps 75 and the first pads 25 may not be properly bonded, and the lead wiring 95 and the second pad 27 may not be properly bonded, resulting in poor bonding.

In an embodiment of the invention, as described above, the second modulus of the second coated layer is greater than the first modulus. In such an embodiment, the rigidity or strength of the second coated layer 130 is greater than that of the first coated layer 110. Therefore, when the bumps 75 are bonded to the first pads 25 and when the lead wiring 95 is bonded to the second pad 27, the second coated layer 130 may securely support the bumps 75 and the first pads 25 and the lead wiring 95 and the second pad 27, such that poor bonding between the bumps 75 and the first pads 25 and between the lead wiring 95 and the second pad 27 may be effectively prevented.

A method of manufacturing a display device according to an embodiment will now be described in detail. In the following embodiments, the same or like elements as those of the above-described embodiments will be indicated by the same reference numerals, and any repetitive detailed description thereof will be omitted or simplified.

Figure 7:
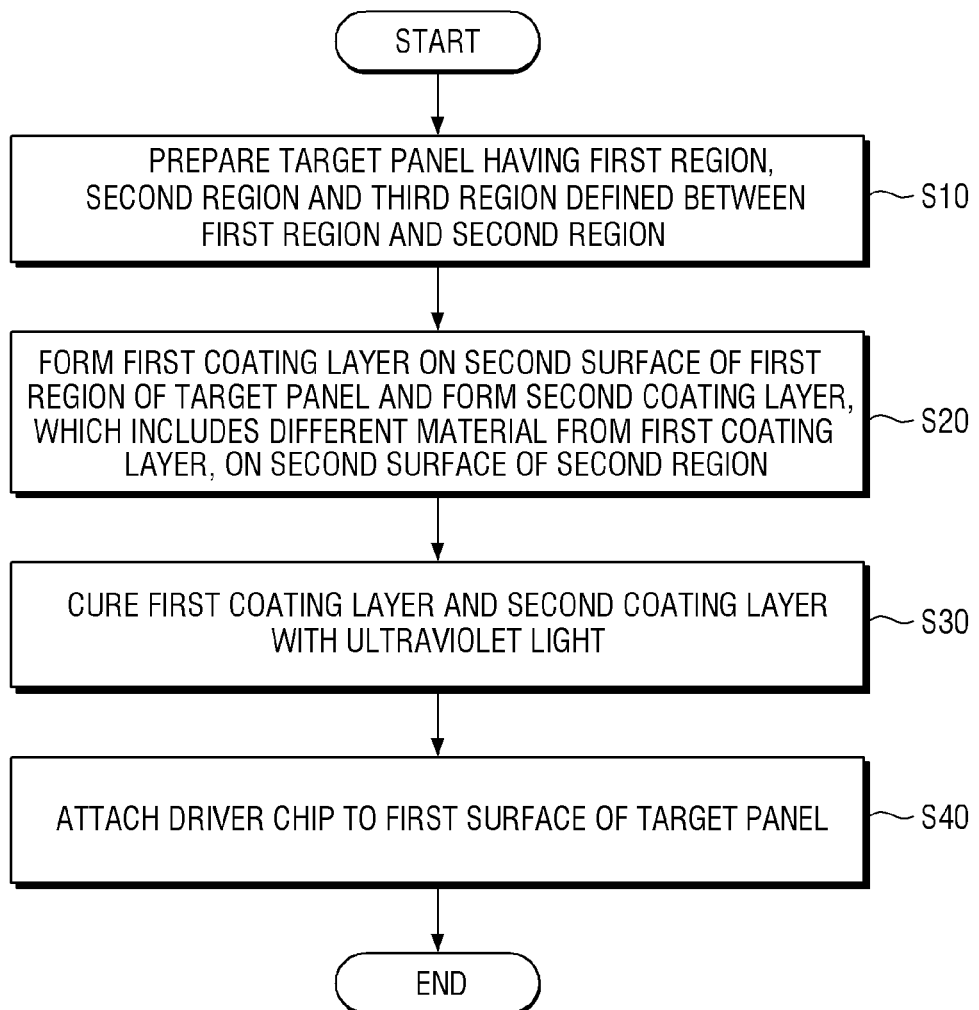
FIG. 7 is a flowchart illustrating a method of manufacturing a display device according to an embodiment.

FIG. 7 is a flowchart illustrating a method of manufacturing a display device according to an embodiment. FIGS. 8 through 12 are cross-sectional views illustrating operations in a process of manufacturing a display device.

Figure 8:
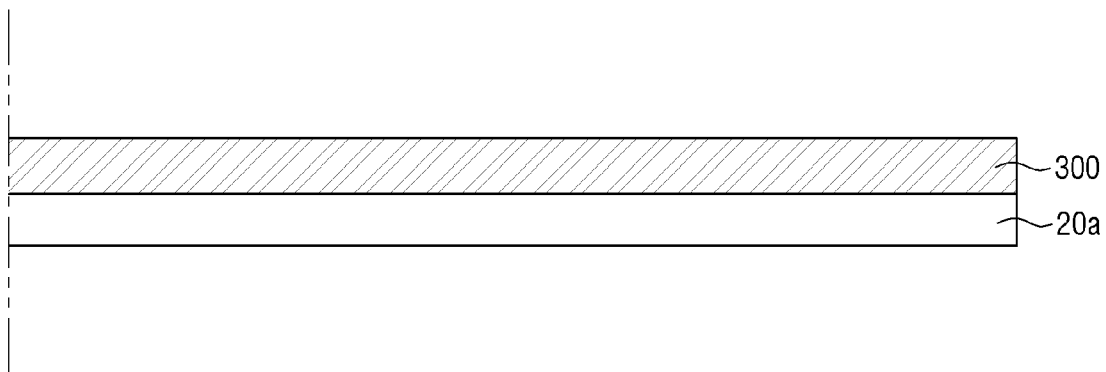
FIGS. 8 through 12 are cross-sectional views illustrating operations in a process of manufacturing a display device.

First, referring to FIGS. 7 and 8, a target panel 20a including a first region, a second region, and a third region defined between the first region and the second region is prepared (S10).

The first region may be the same as the main region MR of FIG. 2, the second region may be the same as the sub region SR of FIG. 2, and the third region may be the same as the bending region BR of FIG. 2.

In an embodiment, the target panel 20a may be substantially the same as the display member 20 of FIGS. 3A and 3B. In such an embodiment, the target panel 20a may be the display member 20 on which the polarizing member 40 is not disposed.

The preparing of the target panel 20a including the first region, the second region, and the third region defined between the first and second region (operation S10) may further include forming a release film 300 on a first surface of the target panel 20a. The release film 300 may support the first surface of the target panel 20a when a first coated layer 110 and a second coated layer 130 to be described later are formed.

The release film 300 may include or be made of any material as long as the release film 300 is allowed to support the target panel 20a.

Figure 9:
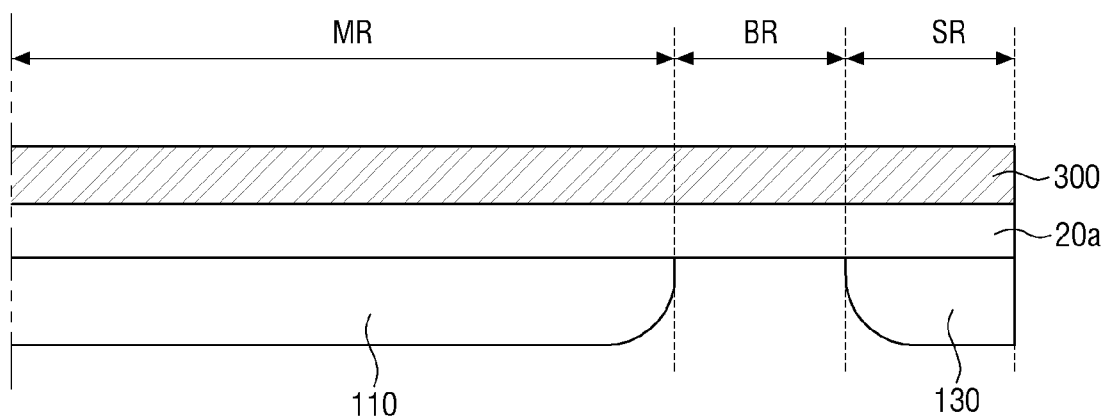

Next, referring to FIGS. 7 and 9, the first coated layer 110 and the second coated layer 130 are provided or formed on a second surface which is opposite the first surface of the target panel 20a (S20). The second coated layer 130 and the first coated layer 110 may include or be made of different materials from each other.

The first coated layer 110 may be provided or formed on a second surface of the first region (main region MR) of the target panel 20a, and the second coated layer 130 may be provided or formed on a second surface of the second region (sub region SR) of the target panel 20a.

The providing or forming of the first coated layer 110 and the second coated layer 130 may include providing or forming a first coated layer material on the second surface of the first region of the target panel 20a and providing or forming a second coated layer material on the second surface of the second region of the target panel 20a. Each of the first coated layer material and the second coated layer material may include a photosensitive resin.

The providing or forming of the first coated layer material on the second surface of the first region of the target panel 20a and the providing or forming of the second coated layer material on the second surface of the second region of the target panel 20a may further include directly coating the first coated layer material and the second coated layer material on the second surface of the target panel 20a.

The providing or forming of the first coated layer material on the second surface of the first region of the target panel 20a and the providing or forming of the second coated layer material on the second surface of the second region of the target panel 20a may further include aligning an inner side surface of the first coated layer material with a boundary between the first region and the third region and aligning an inner side surface of the second coated layer material with a boundary between the second region and the third region.

The second coated layer material may further include a first material. In an embodiment, the first material may include an organic material. The organic material may be at least one material selected from an acrylic organic material and PC. In an embodiment, the first material may include an inorganic material. The inorganic material may be a metal oxide or a non-metal oxide. The metal oxide may be, for example, aluminum oxide (AlO) or zirconium oxide (ZrO), and the non-metal oxide may be, for example, silicon oxide (SiO). In an embodiment, the first material may include both the organic material and the inorganic material.

Referring to FIGS. 7 and 9, the method may further include curing the first coated layer material and the second coated layer material (S30) after the providing or forming of the first coated layer material on the second surface of the first region of the target panel 20a and the providing or forming of the second coated layer material on the second surface of the second region of the target panel 20a. The curing of the first coated layer material and the second coated layer material may be achieved by an ultraviolet curing process.

Through the ultraviolet curing process, the first coated layer material and the second coated layer material may be changed to the first coated layer 110 and the second coated layer 130 described above with reference to FIG. 2.

The first coated layer 110 may have a first modulus, and the second coated layer 130 may have a second modulus. In an embodiment, the second modulus may be greater than the first modulus. In such an embodiment, the first modulus may be smaller than the second modulus. In such an embodiment, the rigidity or strength of the second coated layer 130 may be greater than that of the first coated layer 110. The first modulus may be in a range of about 20 MPa to about 400 MPa, and the second modulus may be in a range of about 500 MPa to about 2 GPa.

Figure 10:
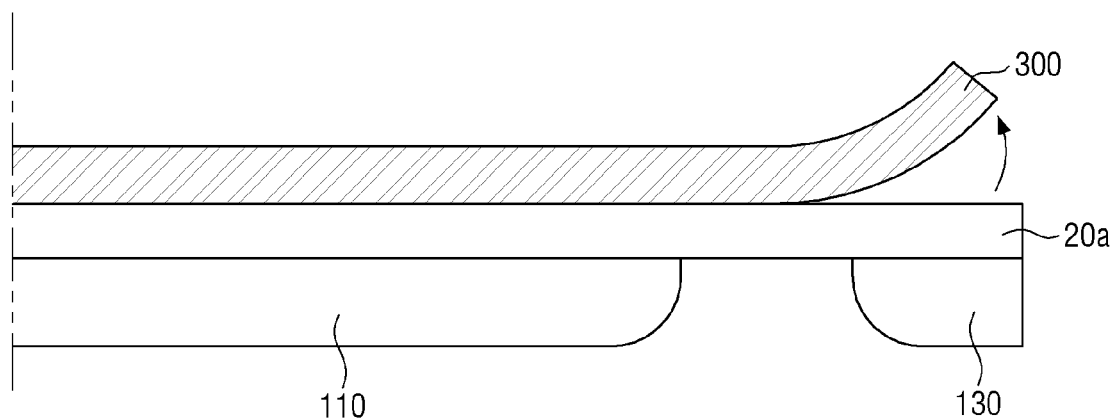

Next, referring to FIG. 10, the release film 300 is peeled from the first surface of the target panel 20a. Therefore, the first surface of the target panel 20a may be exposed.

Figure 11:
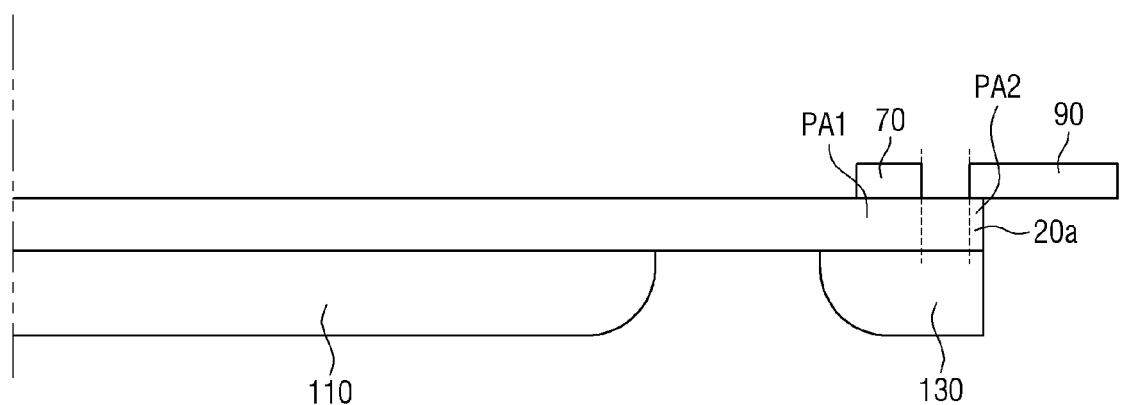

Next, referring to FIGS. 7 and 11, a driver chip 70 and a circuit board 90 are attached onto the first surface of the target panel 20a exposed by the peeled release film 300 (S40).

Figure 12:
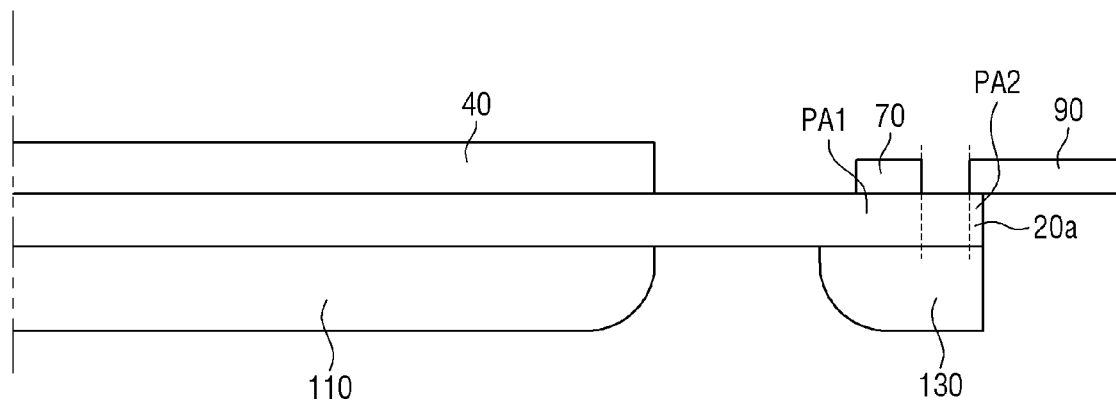

Next, referring to FIG. 12, a polarizing member 40 is provided or disposed on a first surface of the first region (main region MR) of the target panel 20a.

In the providing of the polarizing member 40, a bonding member may be provided or formed between the polarizing member 40 and the target panel 20a to bond the polarizing member 40 and the target panel 20a to each other.

Figure 13:
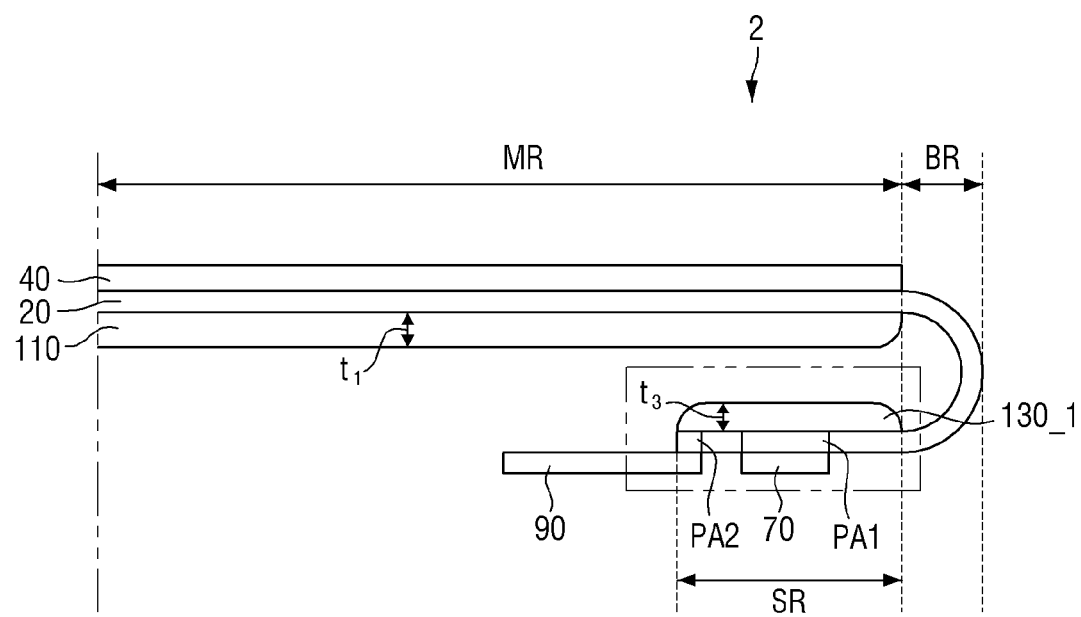
FIG. 13 is a cross-sectional view of a display device according to an alternative embodiment.

FIG. 13 is a cross-sectional view of a display device 2 according to an alternative embodiment.

Referring to FIG. 13, the display device 2 is substantially the same as the display device 1 of FIG. 4 except that a second coated layer 130_1 is thinner than a first coated layer 110.

In such an embodiment, the second coated layer 130_1 of the display device 2 may have a third thickness t3. The third thickness t3 may be smaller than a first thickness t1. The third thickness t3 may be in a range from about 5 μm to about 50 μm.

Since the third thickness t3 of the second coated layer 130_1 of the display device 2 is smaller than the first thickness t1 of the first coated layer 110, a sub region SR of a display member 20 may be protected more effectively by a second release film to be disposed on a second surface of the display member 20.

In such an embodiment, when bumps 75 of a driver chip 70 are bonded to first pads and when a lead wiring 95 of a circuit board 90 is bonded to a second pad 27, heat and pressure may be applied to bonding members 200 and ACF2 through the driver chip 70 and the circuit board 90 in a state where the bonding members 200 and ACF2 are interposed between the bumps 75 and the first pads 25 and between the lead wiring 95 and the second pad 27, respectively. Here, if the rigidity or hardness of the second coated layer 130_1 is low, it may be difficult for the second coated layer 130_1 to support the bumps 75 and the first pads 25 and the lead wiring 95 and the second pad 27 when the bumps 75 and the first pads 25 are bonded to each other and when the lead wiring 95 and the second pad 27 are bonded to each other. Specifically, if the second modulus of the second coated layer 130_1 is low, when the bumps 75 are bonded to the first pads 25 and when the lead wiring 95 is bonded to the second pad 27, the second coated layer 130_1 may fail to securely support the bumps 75 and the first pads 25 and the lead wiring 95 and the second pad 27 and may move in a direction in which pressure is applied through the driver chip 70 and the circuit board 90 together with the display member 20 including a flexible substrate. In this case, the bumps 75 and the first pads 25 may not be properly bonded, and the lead wiring 95 and the second pad 27 may not be properly bonded, resulting in poor bonding.

In an embodiment, the second modulus of the second coated layer 130_1 is greater than the first modulus as described above. In such an embodiment, the rigidity or strength of the second coated layer 130_1 is greater than that of the first coated layer 110. Therefore, when the bumps 75 are bonded to the first pads 25 and when the lead wiring 95 is bonded to the second pad 27, the second coated layer 130_1 may securely support the bumps 75 and the first pads 25 and the lead wiring 95 and the second pad 27, such that poor bonding between the bumps 75 and the first pads 25 and between the lead wiring 95 and the second pad 27 may be effectively prevented.

Figure 14:
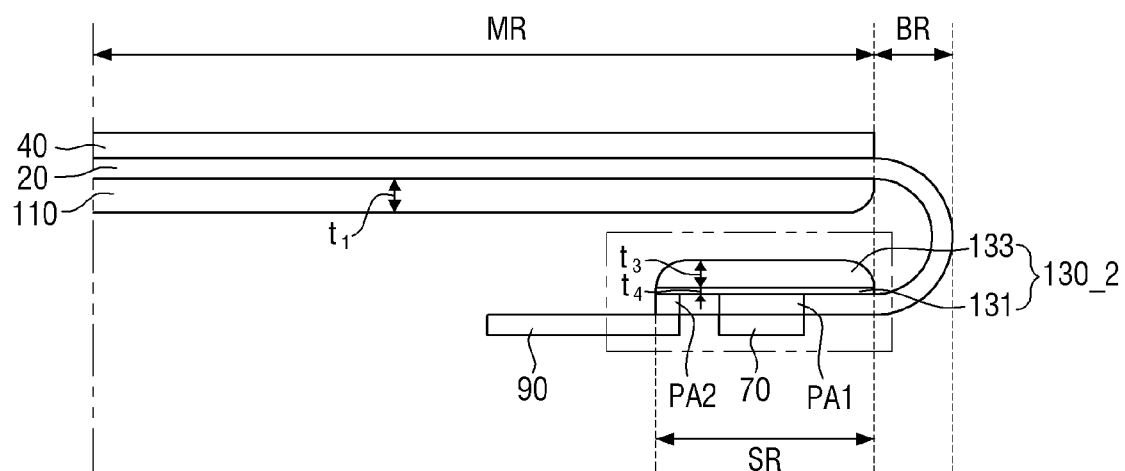
FIG. 14 is a cross-sectional view of a display device according to another alternative embodiment.

FIG. 14 is a cross-sectional view of a display device 3 according to another alternative embodiment.

Referring to FIG. 14, the display device 3 is substantially the same as the display device 1 of FIG. 4 except that a third coated layer 131 is further disposed between a second surface of a sub region SR of a display member 20 and a second coated layer 133.

In an embodiment of the display device 3 shown in FIG. 14, a heterogeneous coated layer 130_2 may be disposed on the second surface of the sub region SR of the display member 20. The heterogeneous coated layer 130_2 may be disposed directly on the second surface of the sub region SR.

The heterogeneous coated layer 130_2 may include the third coated layer 131 disposed on the second surface of the sub region SR and the second coated layer 133 disposed on the third coated layer 131. The second coated layer 133 may include substantially the same material as the second coated layer 130 described above with reference to FIG. 4.

The second coated layer 133 may have a third thickness t3, and the third coated layer 131 may have a fourth thickness t4. The sum of the third thickness t3 and the fourth thickness t4 may be substantially the same as the third thickness t3 of the second coated layer 130_1 of FIG. 13.

The third thickness t3 of the second coated layer 133 may be in a range from about μm to about 20 μm, and the fourth thickness t4 of the third coated layer 131 may be in a range from about 5 μm to about 30 μm.

Each of the second coated layer 133 and the third coated layer 131 may be formed by coating a photosensitive rein on a second surface of the display member 20. The coated photosensitive resin may be changed to the second coated layer 133 and the third coated layer 131 through a curing process such as ultraviolet curing.

An inner side surface of the third coated layer 131 may be aligned with an inner side surface of the second coated layer 133 in the thickness direction. The inner side surface of the third coated layer 131 may be aligned with a boundary between a bending region BR and the sub region SR. However, embodiments are not limited to this case. Alternatively, the inner side surface of the third coated layer 131 may be recessed further inward or may protrude further outward than the inner side surface of the second coated layer 133. In an embodiment, where the inner side surface of the third coated layer 131 protrudes further outward, the third coated layer 131 may partially cover the inner side surface of the second coated layer 133.

In such an embodiment, the inner side surface of each of the second coated layer 133 and the third coated layer 131 may have a round shape. That is, each of the inner side surface of the second coated layer 133 which is aligned with the boundary between the sub region SR and the bending region BR and the inner side surface of the third coated layer 131 which is aligned with the boundary between the sub region SR and the bending region BR may have a round shape. Therefore, when a display panel 10 is bent in the bending region BR, physical damage at the boundary between the bending region BR and the sub region SR may be effectively prevented.

In such an embodiment, the second coated layer 133 may have a third modulus. The third modulus may be substantially the same as a first modulus of a first coated layer 110. In such an embodiment, the third modulus may be equal to the first modulus.

In such an embodiment, the second coated layer 133 and the first coated layer 110 may include the same material and may be formed on the second surface of the display member 20 by a same process.

In such an embodiment, when bumps 75 of a driver chip 70 are bonded to first pads and when a lead wiring 95 of a circuit board 90 is bonded to a second pad 27, heat and pressure may be applied to bonding members 200 and ACF2 through the driver chip 70 and the circuit board 90 in a state where the bonding members 200 and ACF2 are interposed between the bumps 75 and the first pads 25 and between the lead wiring 95 and the second pad 27, respectively. Here, if the rigidity or hardness of the heterogeneous coated layer 130_2 is low, it may be difficult for the heterogeneous coated layer 130_2 to support the bumps 75 and the first pads 25 and the lead wiring 95 and the second pad 27 when the bumps 75 and the first pads 25 are bonded to each other and when the lead wiring 95 and the second pad 27 are bonded to each other. Specifically, if a modulus of the heterogeneous coated layer 130_2 is low, when the bumps 75 are bonded to the first pads and when the lead wiring 95 is bonded to the second pad 27, the heterogeneous coated layer 130_2 may fail to securely support the bumps 75 and the first pads 25 and the lead wiring 95 and the second pad 27 and may move in a direction in which pressure is applied through the driver chip 70 and the circuit board 90 together with the display member 20 including a flexible substrate. In this case, the bumps 75 and the first pads 25 may not be properly bonded, and the lead wiring 95 and the second pad 27 may not be properly bonded, resulting in poor bonding.

In an embodiment, as shown in FIG. 14, the heterogeneous coated layer 130_2 further includes the third coated layer 131 having a second modulus greater than the first modulus and the third modulus as described above. Therefore, when the bumps 75 are bonded to the first pads 25 and when the lead wiring 95 is bonded to the second pad 27, the heterogeneous coated layer 130_2 may securely support the bumps 75 and the first pads 25 and the lead wiring 95 and the second pad 27, such that poor bonding between the bumps 75 and the first pads 25 and between the lead wiring 95 and the second pad 27 may be effectively prevented.

Figure 15:
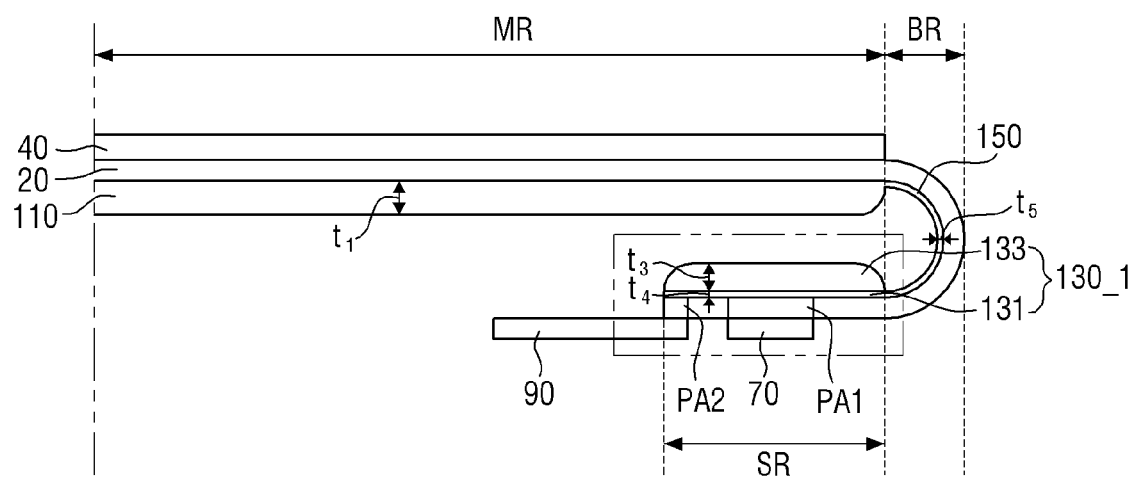
FIG. 15 is a cross-sectional view of a display device according to another alternative embodiment.

FIG. 15 is a cross-sectional view of a display device according to another alternative embodiment.

Referring to FIG. 15, the display device is substantially the same as the display device 3 of FIG. 14 except that a fourth coated layer 150 is further disposed on a second surface of a display member 20 in a bending region BR.

In such an embodiment, a first side surface of the fourth coated layer 150 may be aligned with a boundary between a main region MR and the bending region BR, and a second side surface of the fourth coated layer 150 may be aligned with a boundary between a sub region SR and the bending region BR.

The fourth coated layer 150 may contact a first coated layer 110 and a third coated layer 131 of a heterogeneous coated layer 130_1. That is, the first side surface of the fourth coated layer 150 may contact the first coated layer 110, and the second side surface of the fourth coated layer 150 may contact the third coated layer 131.

In an embodiment, the fourth coated layer 150 may be spaced apart from an inner side surface of the first coated layer 110 by a predetermined distance without contacting the inner side surface of the first coated layer 110.

In an embodiment, the fourth coated layer 150 may be spaced apart from an inner side surface of the third coated layer 131 of the heterogeneous coated layer 130_1 by a predetermined distance without contacting the inner side surface of the third coated layer 131.

In an embodiment, the fourth coated layer 150 may be spaced apart from each of the inner side surface of the first coated layer 110 and the inner side surface of the third coated layer 131 of the heterogeneous coated layer 130_1 by a predetermined distance without contacting each of the inner side surface of the first coated layer 110 and the inner side surface of the third coated layer 131 of the heterogeneous coated layer 130_1.

The fourth coated layer 150 may have a fifth thickness t5. The fifth thickness t5 may be smaller than each of a first thickness t1 of the first coated layer 110, a third thickness t3 of a second coated layer 133, and a fourth thickness t4 of the third coated layer 131.

The fifth thickness t5 of the fourth coated layer 150 may be in a range from about 2 μm to about 10 μm.

In such an embodiment, the display device further includes the fourth coated layer 150 disposed on the second surface of the bending region BR of the display member 20, such that wirings of the display member 20 disposed in the bending region BR may be prevented from cracking or breaking due to bending.

In such an embodiment, when bumps 75 of a driver chip 70 are bonded to first pads and when a lead wiring 95 of a circuit board 90 is bonded to a second pad 27, heat and pressure may be applied to bonding members 200 and ACF2 through the driver chip 70 and the circuit board 90 in a state where the bonding members 200 and ACF2 are interposed between the bumps 75 and the first pads 25 and between the lead wiring 95 and the second pad 27, respectively. Here, if the rigidity or hardness of the heterogeneous coated layer 130_1 is low, it may be difficult for the heterogeneous coated layer 130_1 to support the bumps 75 and the first pads 25 and the lead wiring 95 and the second pad 27 when the bumps 75 and the first pads 25 are bonded to each other and when the lead wiring 95 and the second pad 27 are bonded to each other. Specifically, if a modulus of the heterogeneous coated layer 130_1 is low, when the bumps 75 are bonded to the first pads and when the lead wiring 95 is bonded to the second pad 27, the heterogeneous coated layer 130_1 may fail to securely support the bumps 75 and the first pads 25 and the lead wiring 95 and the second pad 27 and may move in a direction in which pressure is applied through the driver chip 70 and the circuit board 90 together with the display member 20 including a flexible substrate. In this case, the bumps 75 and the first pads 25 may not be properly bonded, and the lead wiring 95 and the second pad 27 may not be properly bonded, resulting in poor bonding.

In an embodiment, as shown in FIG. 15, the heterogeneous coated layer 130 further includes the fourth coated layer 150?) having a second modulus greater than a first modulus and a third modulus as described above. Therefore, when the bumps 75 are bonded to the first pads 25 and when the lead wiring 95 is bonded to the second pad 27, the heterogeneous coated layer 130_1 may securely support the bumps 75 and the first pads 25 and the lead wiring 95 and the second pad 27, such that poor bonding between the bumps 75 and the first pads 25 and between the lead wiring 95 and the second pad 27 may be effectively prevented.

According to an embodiment, the number of masks used to manufacture a display device may be reduced.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:
   a display panel including a first region, a second region, and a third region defined between the first region and the second region, wherein the first region includes an active region, and the second region is a non-active region and wherein the display panel further includes a first surface and a second surface opposite to the first surface;
   a first coated layer disposed on the first surface of the first region of the display panel; and
   a second coated layer disposed on the first surface of the second region of the display panel,
   wherein:
   the first coated layer has a first modulus,
   the second coated layer has a second modulus, which is greater than the first modulus, and
   the first coated layer directly contacts the first surface of the first region the display panel.

2. The display device of claim 1, wherein
the first modulus is in a range of about 20 MPa to about 400 MPa, and
the second modulus is in a range of about 500 MPa to about 2 GPa.

3. The display device of claim 1, wherein
each of the first coated layer and the second coated layer comprises a cured resin, and
the second coated layer further comprises a first material.

4. The display device of claim 3, wherein the first material comprises at least one of an organic material and an inorganic material.

5. The display device of claim 4, wherein the first material comprises the organic material and the inorganic material.

6. The display device of claim 1, wherein
the second region of the display panel comprises a first pad region and a second pad region,
the first pad region is disposed between the third region and the second pad region,
a driver chip is attached to the second surface of the first pad region of the display panel,
a circuit board is attached to the second surface of the second pad region of the display panel, and
the second coated layer overlaps the driver chip.

7. The display device of claim 1, wherein the second coated layer directly contacts the first surface of the second region of the display panel.

8. The display device of claim 1, wherein a thickness of the first coated layer is greater than a thickness of the second coated layer.

9. The display device of claim 1, further comprising:
a third coated layer sandwiched between the second coated layer and the first surface of the second region of the display panel,
wherein the third coated layer has a third modulus less than the second modulus.

10. The display device of claim 9, wherein
the third coated layer directly contacts the second coated layer and the first surface of the second region of the display panel.

11. The display device of claim 9, wherein the third coated layer is made of a same material as the first coated layer.

12. The display device of claim 11, wherein the third coated layer is spaced apart from the first coated layer.

13. The display device of claim 9, wherein
a thickness of the third coated layer is less than a thickness of the second coated layer, and
the thickness of the second coated layer is less than a thickness of the first coated layer.

14. The display device of claim 9, further comprising:
a fourth coated layer disposed on the first surface of the third region of the display panel,
wherein the fourth coated layer has a fourth modulus less than the second modulus.

15. The display device of claim 14, wherein the fourth coated layer directly contacts the first surface of the third region of the display panel.

16. The display device of claim 14, wherein the first coated layer, the third coated layer and the fourth coated layer are made of a same material.

17. The display device of claim 16, wherein
the first layer, the third coated layer and the fourth coated layer are integrally formed.

18. The display device of claim 14, wherein
a thickness of the fourth coated layer is less than a thickness of the third coated layer.

19. The display device of claim 18, wherein
the thickness of the third coated layer is less than a thickness of the second coated layer, and
the thickness of the second coated layer is less than a thickness of the first coated layer.

* * * * *